United States Patent
Wardani

[11] Patent Number: 5,992,671
[45] Date of Patent: Nov. 30, 1999

[54] POT WITH LOCKABLE LID

[75] Inventor: Dewi Sri Wardani, Surabaya, Indonesia

[73] Assignee: Pt. Kita Makmur Metal Industrial, Surabaya, Indonesia

[21] Appl. No.: 09/010,601

[22] Filed: Jan. 22, 1998

[51] Int. Cl.[6] ................................................. B65D 41/06
[52] U.S. Cl. .......................... 220/293; 126/389; 220/297; 220/573.1; 220/912
[58] Field of Search .................................... 220/215, 682, 220/912, 573.1, 297, 293, 323, 315, 703, 711, 254, 296; 215/241; 126/373, 389, 384; 99/403, 422

[56] References Cited

U.S. PATENT DOCUMENTS

| | | |
|---|---|---|
| 2,069,125 | 1/1937 | Antrim . |
| 2,764,200 | 9/1956 | Gits .......................................... 220/254 |
| 4,230,238 | 10/1980 | Wilson . |
| 4,333,580 | 6/1982 | Sweigart, Jr. ........................ 220/293 X |
| 4,541,411 | 9/1985 | Woolf . |
| 5,088,614 | 2/1992 | Dumestre ............................ 220/711 X |
| 5,242,079 | 9/1993 | Stephens et al. . |
| 5,275,094 | 1/1994 | Naft ...................................... 220/912 X |
| 5,439,165 | 8/1995 | Cartossi ........................... 220/573.1 X |
| 5,487,329 | 1/1996 | Fissler ........................................ 99/403 |
| 5,676,273 | 10/1997 | Jonkers et al. ........................... 220/293 |
| 5,730,045 | 3/1998 | Delaquis et al. .................... 220/912 X |

FOREIGN PATENT DOCUMENTS 202334  7/1956  Australia ................................ 220/297

*Primary Examiner*—Stephen K. Cronin
*Assistant Examiner*—Robin A. Hylton
*Attorney, Agent, or Firm*—Oppenheimer Wolff & Donnelly LLP

[57] ABSTRACT

A pot is closed off at top by a lid. The pot has an peripheral flange with one or more spaced slotted openings. These openings have an enlarged area slightly greater than one or more aligned elements protruding downwardly from the underside of a peripheral flange on the lid. These elements enter the enlarged areas and the lid can be rotated so that the portions of such elements, interconnecting the elements disposed in the enlarged areas, move into the slots and lock the lid to the pot until rotated back to the original position.

4 Claims, 3 Drawing Sheets

5,992,671

POT WITH LOCKABLE LID

BACKGROUND OF THE INVENTION

Field of the Invention

The invention relates to cooking vessels; and, more particularly, to pots with lockable lids.

BACKGROUND INFORMATION

Cooking vessels are well known in the art and many such vessels have lids which lock to the top of the vessel and can be released when desired. One such vessel is disclosed in U.S. Pat. No. 2,069,125. Here, the lid includes a peripheral flange having a bead or lip which engages and resides in a channel in a peripheral flange in the open top of the vessel. It is difficult to align such flanges and the engaging portions must be carefully machined so that the parts properly engage.

There is a need for a cooking pot having quick and easy means for locking and unlocking a lid to the top of the pot. Such means should be easy and economical to manufacture.

SUMMARY OF THE INVENTION

It is an object of this invention to provide a cooking pot having an improved lockable lid.

It is a further object of this invention to provide a cooking pot having an upper peripheral flange with one or more spaced openings therethrough adapted to receive therein locking elements on the lid extending downwardly from a peripheral flange extending about the lid.

These and other objects are preferably accomplished by providing a pot closed off at top by a lid. The pot has an upper peripheral flange with one or more spaced slotted openings. These openings have an enlarged area slightly greater than one or more aligned elements protruding downwardly from the underside of a peripheral flange on the lid. These elements enter the enlarged areas and the lid can be rotated so that the portions of such elements, interconnecting the elements disposed in the enlarged areas, move into the slots and lock the lid to the pot until rotated back to the original position.

DESCRIPTION OF THE PREFERRED EMBODIMENT

Figure 1:
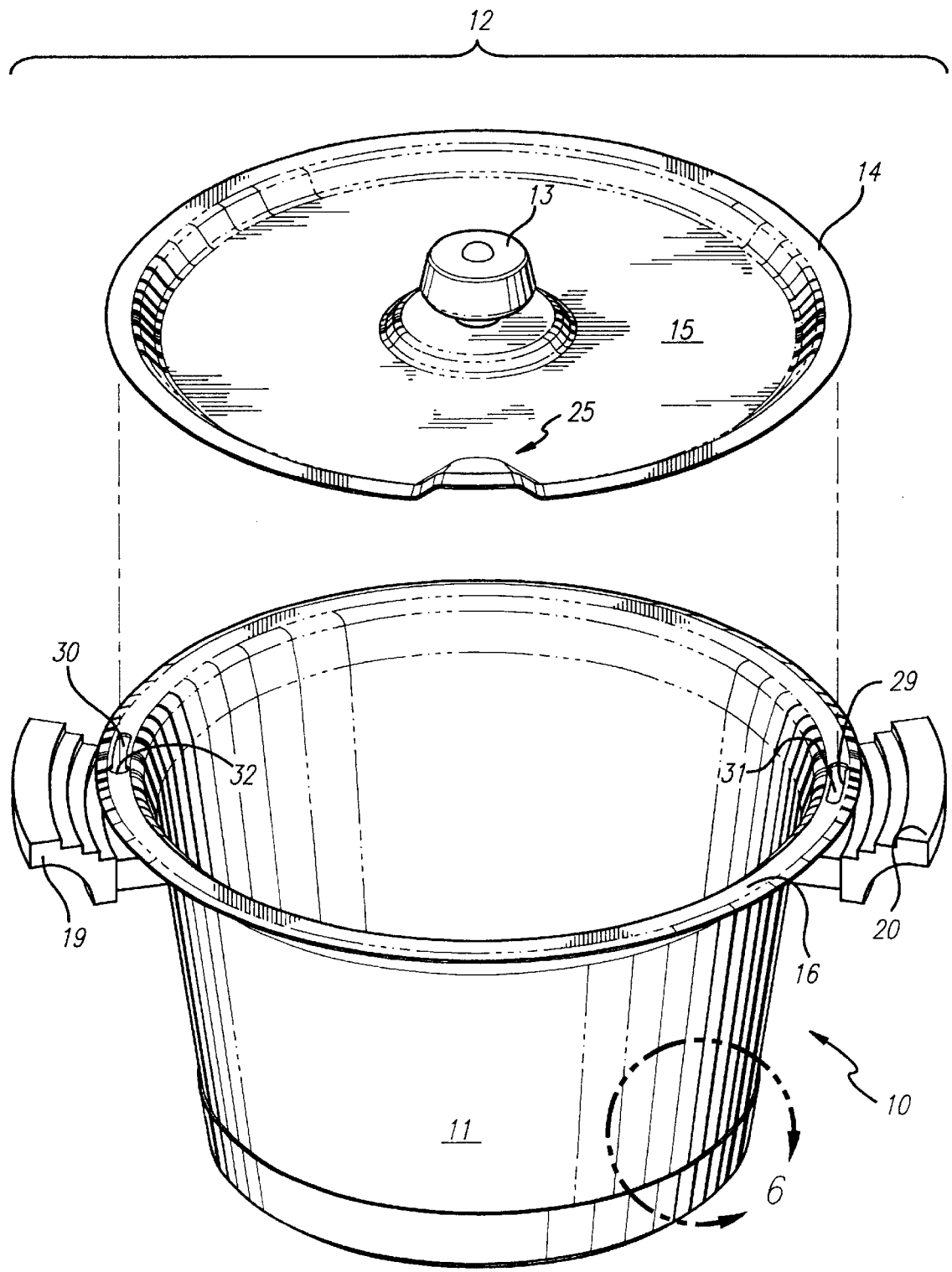
FIG. 1 is an exploded view of a cooking pot in accordance with the teachings of the invention.

Referring now to FIG. 1 of the drawing, a pot 10 is shown having a main body portion 11 adapted to be closed off at top by a lid 12. Lid 12 has a generally centrally located knob 13 and an annular lip 14. As particularly seen in FIG. 3, lip 14 is integral with the main body portion 15 of lid 12 surrounding knob 13. Body portion 15 is depressed or lying in a plane lower than the plane of lip 14 as clearly seen in FIG. 3.

Figure 3:
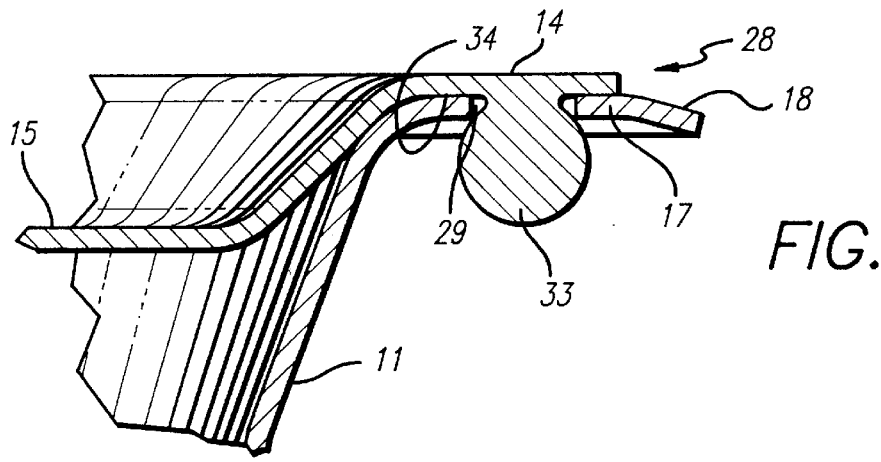
FIG. 3 is a view taken along lines 3—3 of FIG. 2.

Referring again to FIG. 1, an annular rim 16 extends about the periphery of the opening leading into the main body portion 11 of pot 10. As seen in FIG. 3, the main body portion 11 may flare outwardly as shown to rim 16. Rim 16 has a first generally flat portion 17 terminating in an outwardly and downwardly angled portion 18.

Figure 6:
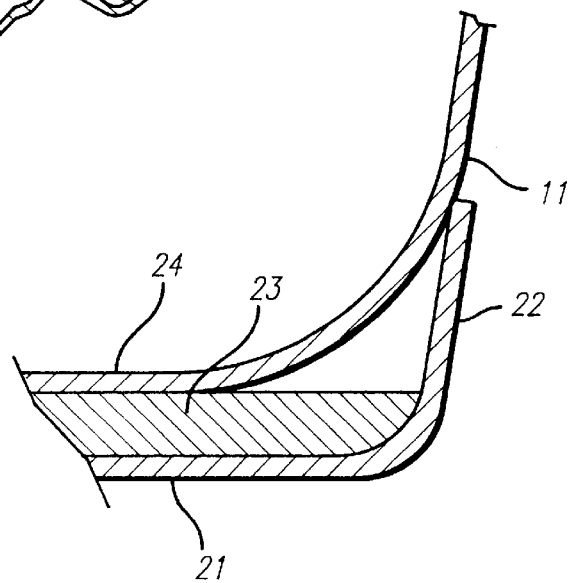
FIG. 6 is a view taken along line 6 of FIG. 1.

A pair of spaced handles 19, 20 (FIG. 1) may be provided on each side of main body portion 11 and secured thereto in any suitable manner for grasping and lifting of the main body portion 11 of pot 10. These handles 19, 20 may be stepped in design, as shown, and of any suitable material, such as a plastic material is, for example, bakelite. Knob 13 may be of similar material. The remainder of pot 10, other than as indicated, may be of any suitable material. For example, as seen in FIG. 6, main body portion 11 may be of stainless steel. The bottom of pot 10 may be a stainless steel plate 21 having an upturned annular flange 22 welded or otherwise secured to main body portion 11. An aluminum core or heat conductive plate 23 may be sandwiched between plate 21 and the bottom 24 of main body portion 11 to provide proper heating to pot 10.

Figure 5:
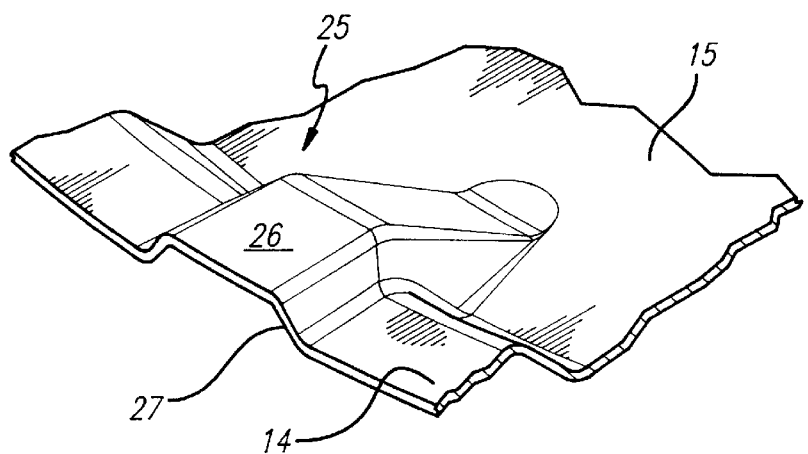
FIG. 5 is a view taken along line 5 of FIG. 2.

Referring again to FIG. 1, a pouring spout 25 may be provided in lid 12. As seen in FIG. 5, pouring spout 25 may be formed in rim 14 as a raised portion 26 providing an opening 27 through which liquids or the like may be poured out of pot 10 when lid 12 is locked in position.

Figure 2:
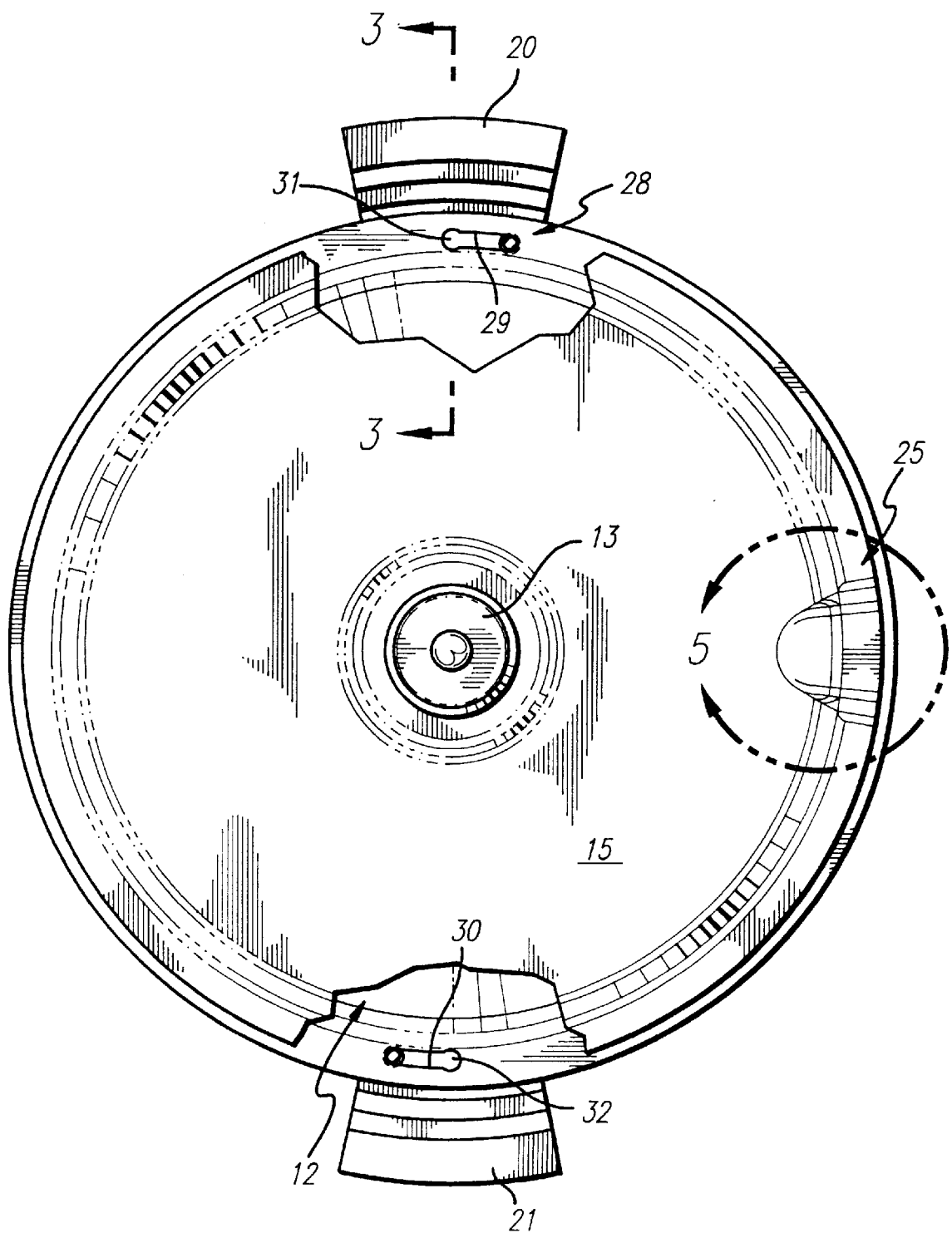
FIG. 2 is a top plan view of the pot of FIG. 1.
Figure 4:
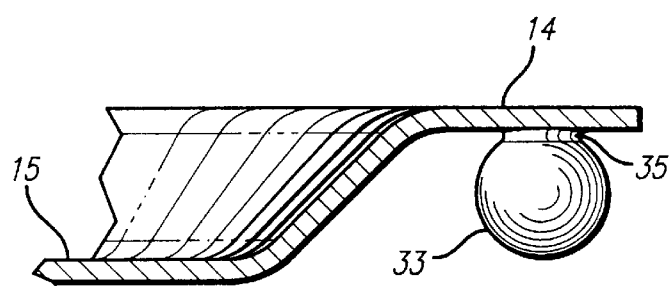
FIG. 4 is a view similar to FIG. 3 of the lid alone.

As particularly contemplated in the present invention, lid locking means 28 (see FIG. 3) are provided in pot 10 for securely locking lid 10 to rim 16. Such locking means 28 includes a pair of spaced elongated slots 29, 30 (see also FIG. 2) having enlarged round openings 31, 32, respectively, at one end. Locking means 28 further includes a pair of balls 33 (see FIGS. 3 and 4—only one ball visible) integral with the underside 34 of rim 14 extending downwardly therefrom and aligned with the enlarged openings 31, 32 in slots 29, 30 when lid 12 is placed on top of rim 16.

It is to be understood that the diameter of balls 33 is generally related to the diameter of the enlarged round openings 31, 32 so that balls 33 are receivable therein. Also, balls 33 have an integral neck 35 (see particularly FIG. 4) of lesser diameter than the width of slots 29, 30.

In operation, lid 12 is placed on top of rim 16 with balls 33 entering opening 31, 32. Lid 12 is now rotated slightly in a clockwise direction so that necks 35 of balls 33 move from openings 31, 32 into slots 29, 30. The width of slots 29, 30 is generally related to the diameter of necks 35 so that necks 35 slide through the slot 20, 30 to the ends thereof thereby locking lid 12 to rim 16. When it is desired to remove lid 12 from rim 16, lid 12 is rotated slightly counterclockwise until balls 33 once again enter openings 31, 32. The lid 12 can now be lifted off of rim 16 and removed from engagement therewith.

Balls 33 may be of the same material as lid 12 (except for knob 13) such as stainless steel. Although round balls 33 and round openings 31, 32 have been discussed, obviously any suitable detent means may be used wherein one or more elements, depending downwardly from the underside of rim 14, may be mounted in suitable aligned openings in rim 16, the latter openings being configured to trap such element or elements therein, when lid 12 is in a first position, then permit disengagement of such element or elements from such openings when lid 12 is rotated to a second position.

Thus, one or more such balls or elements may be provided with a suitable number of openings. Further, slots 29, 30 may have enlarged openings 31, 32 at ends opposite to that shown in FIG. 1 so that lid 12 is rotated in a counterclockwise direction to lock the lid to the rim 16, then rotated in an opposite or clockwise direction to release the same.

Any suitable dimensions may be used.

There is thus disclosed a unique locking means between the lid of a pot and the main body thereof. Although there is disclosed a particular embodiment of the invention, variations thereof may occur to an artisan and the scope of the invention should only be limited by the scope of the appended claims.

I claim:

1. In a pot having a main body portion including a bottom and an integral side, said main body portion being closed at the top by a lid having an outer peripheral edge, the improvement which comprises:

a peripheral rim extending about the periphery of the open top of said main body portion;

a peripheral rim extending about the peripheral outer edge of said lid;

locking means associated with both said lid and said top, said locking means including at least one opening through said rim of said main body portion, said lid including at least one element engaging said opening for locking said lid to said top, said locking means includes said opening being an elongated narrow slot having a wider portion at one end of said slot, and said element comprising at least one downwardly extending element on the underside of said lid receivable in said wider portion of said slot, and said locking means further including said element being of a size slightly smaller than said wider portion and connected to said lid by a reduced diameter portion lesser in width than said element and slightly less in width than the narrow slot whereby, when said element enters said wider portion of said slot, and said lid is rotated so that said reduced diameter portion enters said narrow slot, said lid is locked to said open top until said lid is rotated back to its original position; and pouring spout means on said lid for pouring liquids out of said pot when said lid is locked to said top, wherein said rim of said lid lies in a substantially horizontally extending plane and said pouring spout means comprises a raised portion on said rim of said lid spaced from the horizontally extending plane of said rim.

2. The pot of claim 1 wherein said locking means includes at least a pair of said elements and at least a pair of openings, said elements being aligned with said openings when said lid is placed on said open top.

3. The pot of claim 2 wherein said elements are round balls connected to said lid by neck portions of a lesser diameter than said balls, said wider portions being round for receiving said balls therein, said neck portions being movable into said slots when said lid is rotated.

4. The pot of claim 1 wherein the bottom of said main body portion includes a chamber having a heat conductive plate mounted therein.

* * * * *